Aug. 13, 1946.   A. GRUNOW   2,405,825
DIE SET
Original Filed April 5, 1945

Alfred W. Grunow INVENTOR.
BY

Patented Aug. 13, 1946

2,405,825

UNITED STATES PATENT OFFICE 2,405,825

DIE SET

Alfred Grunow, Nutley, N. J.

Original application April 5, 1945, Serial No. 586,794. Divided and this application October 5, 1945, Serial No. 620,544

4 Claims. (Cl. 164—118)

My invention relates to improvements in die sets and especially, has reference to and is illustrated in the accompanying drawing as applied to the guide post bearings thereof, which bearings are adjustable longitudinally and rotationally, thereby providing for the taking up of wear and insuring more correct and uniform action. This application is a division of my co-pending patent application Ser. No. 586,794.

Figure 1:
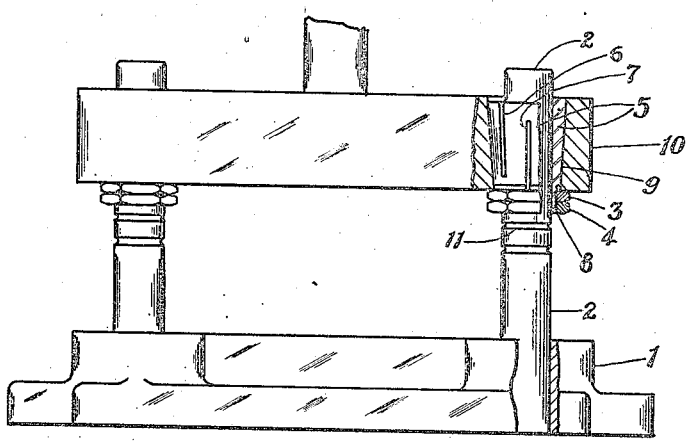
Figure 2:
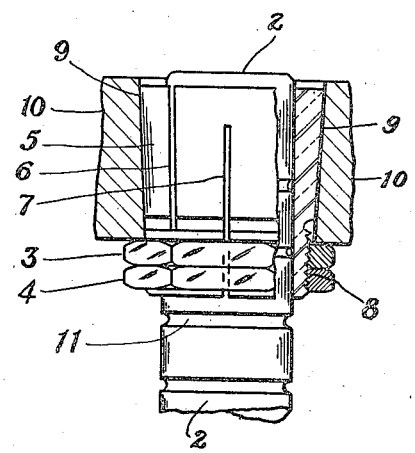

Referring to said drawing, Fig. 1 illustrates in front elevation, parts being broken away, a portion of one side of a die set embodying an application of my invention, and Fig. 2 is an enlarged detail of the upper portion thereof.

1 indicates the die-shoe or holder in which is secured the guide post 2, and 3, 4 indicate the nut and jam-nut respectively, threadably engaging the bushing 5, slotted alternately from top and bottom as shown at 6, 7, said bushing being threaded externally as indicated at 8. The bushing is seated in tapered hole 9 in the punch holder 10, and guides its travel or reciprocation on guide post 2, annular grooves 11 serving to retain the grease or lubrication therefor.

In applying my invention, the punch holder 10 with its bearing bushing 9 is pushed down on guide post 2, over which nuts 3 and 4 have already been dropped. These nuts are then engaged and tightened upon the lower threaded end of the bushing, nut 3 being first tightened against the underside of the holder plate 10 and then lock nut 4.

Any wear developing between the post 2 and bushing 5 may be taken up by nuts 3 and 4, and any unevenness or lateral wear due to slight misalignment, may be rectified by rotating the bushing 5 before tightening nuts 3, 4. Thus simple, quickly adjustable, and inexpensive means are provided for safeguarding the die from undue wear, destructive lateral distortion and for expensive repairs causing suspension of its operation.

Of course it will be understood that various modifications may be made in the construction and arrangement of parts without departing from the spirit of the invention as claimed.

I claim:

1. A die set having movable and immovable parts, guide posts secured therebetween, tapered holes in one of said parts in alignment with said posts, tapered bearings in said holes surrounding said posts, said bearings being contractable to take up the wear between said posts and said bearings, and means for adjusting said bearings.

2. A die set having movable and immovable parts, guide posts secured therebetween, tapered holes in one of said parts in alignment with said posts, tapered bearings in said holes surrounding said posts, said bearings being contractable to take up the wear between said posts and said bearings, and external means for adjusting said bearings.

3. A die set having movable and immovable parts, guide posts secured therebetween, tapered holes in one of said parts in alignment with said posts, tapered bearings in said holes surrounding said posts, said bearings being contractable to take up the wear between said posts and said bearings, and means for adjusting said bearings longitudinally and rotatably.

4. A die set having movable and immovable parts, guide posts secured therebetween, tapered holes in one of said parts in alignment with said posts, tapered bearings in said holes surrounding said posts, said bearings being contractable to take up the wear between said posts and said bearings, and threadably engaging means for drawing said contractable bearings axially through said tapered holes.

ALFRED GRUNOW.